United States Patent
Thomas

(10) Patent No.: US 11,972,093 B2
(45) Date of Patent: *Apr. 30, 2024

(54) SYSTEM AND METHOD FOR AGGREGATION AND COMPARISON OF MULTI-TAB CONTENT

(71) Applicant: eBay Inc., San Jose, CA (US)

(72) Inventor: Evan Patrick Thomas, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/057,944

(22) Filed: Nov. 22, 2022

(65) Prior Publication Data

US 2023/0082174 A1 Mar. 16, 2023

Related U.S. Application Data

(63) Continuation of application No. 15/953,777, filed on Apr. 16, 2018, now Pat. No. 11,537,271.

(51) Int. Cl.
*G06F 3/0482* (2013.01)
*G06F 3/0483* (2013.01)
(Continued)

(52) U.S. Cl.
CPC .......... *G06F 3/0483* (2013.01); *G06F 3/0482* (2013.01); *G06F 40/30* (2020.01); *H04L 67/02* (2013.01)

(58) Field of Classification Search
CPC ...... G06F 3/0483; G06F 3/0482; G06F 40/30; H04L 67/02
See application file for complete search history.

(56) References Cited

U.S. PATENT DOCUMENTS 6,873,968 B2   3/2005   Ehrlich et al.
6,976,006 B1   12/2005  Verma et al.
(Continued)

FOREIGN PATENT DOCUMENTS

CN   105719156 A   6/2016
JP   2003533755    11/2003
(Continued)

OTHER PUBLICATIONS

U.S. Appl. No. 15/953,777, "Non-Final Office Action", U.S. Appl. No. 15/953,777, dated Nov. 7, 2018, 18 pages.
(Continued)

*Primary Examiner* — Kyle R Stork
(74) *Attorney, Agent, or Firm* — FIG. 1 Patents

(57) ABSTRACT

Methods, systems, and apparatus for facilitating a comparison of content in a user interface are described. Two or more open browser interfaces of a browser are identified, each of the two or more open browser interfaces containing an item description of one or more items. The browser interfaces include at least one of a tab of the browser or a window of the browser. One or more features related to each of the one or more items from at least two of the item descriptions are extracted or identified. The comparison for a plurality of items is generated based on the extracted or identified one or more features. The comparison of the plurality of items is displayed within at least one of the browser interfaces.

20 Claims, 13 Drawing Sheets

(51) Int. Cl.
*G06F 40/30* (2020.01)
*H04L 67/02* (2022.01)

(56) References Cited

U.S. PATENT DOCUMENTS

| | | | |
|---|---|---|---|
| 7,107,226 | B1 | 9/2006 | Cassidy et al. |
| 7,302,429 | B1 | 11/2007 | Wanker |
| 7,912,755 | B2 | 3/2011 | Perry et al. |
| 8,191,007 | B1 | 5/2012 | Veloz, III |
| 8,255,291 | B1 | 8/2012 | Nair |
| 9,418,375 | B1 | 8/2016 | Cunico et al. |
| 9,600,836 | B2 | 3/2017 | Chung et al. |
| 11,537,271 | B2 * | 12/2022 | Thomas ................ G06F 16/957 |
| 2002/0178014 | A1 | 11/2002 | Alexander |
| 2007/0022020 | A1 | 1/2007 | Bernstein |
| 2007/0073592 | A1 | 3/2007 | Perry et al. |
| 2007/0073758 | A1 * | 3/2007 | Perry ................ G06Q 30/0633 |
| | | | 707/999.102 |
| 2008/0140577 | A1 | 6/2008 | Rahman et al. |
| 2011/0106791 | A1 | 5/2011 | Maim |
| 2011/0119161 | A1 | 5/2011 | Van Treeck |
| 2012/0226698 | A1 | 9/2012 | Silvestre |
| 2013/0173431 | A1 | 7/2013 | Nations |
| 2014/0052577 | A1 | 2/2014 | Gotlieb et al. |
| 2014/0122225 | A1 | 5/2014 | Vasthimal et al. |
| 2014/0279249 | A1 | 9/2014 | Westphal |
| 2016/0085428 | A1 | 3/2016 | Ashby |
| 2016/0103569 | A1 | 4/2016 | Zatalovski |
| 2016/0139750 | A1 | 5/2016 | Barrus et al. |
| 2016/0300295 | A1 | 10/2016 | Westphal et al. |
| 2017/0293419 | A1 | 10/2017 | Dipin |
| 2018/0113583 | A1 | 4/2018 | Jain et al. |
| 2018/0225388 | A1 * | 8/2018 | Bhupatiraju ........ G06F 16/9577 |
| 2019/0317647 | A1 | 10/2019 | Thomas |

FOREIGN PATENT DOCUMENTS

| | | |
|---|---|---|
| JP | 2013093027 | 5/2013 |
| WO | WO-0109769 | 2/2001 |
| WO | WO-2002035421 | 5/2002 |
| WO | WO-2019204181 | 10/2019 |

OTHER PUBLICATIONS 19720744.2 , "Summons to Attend Oral Proceedings", EP Application No. 19720744.2, May 11, 2023, 7 pages.
Kayce , "Analyze Runtime Performance", Retrieved from the Internet: URL:https://developer.chrome.com/docs/devtools/performance/, Apr. 6, 2017, pp. 1-17.
"Final Office Action", U.S. Appl. No. 15/953,777, dated May 24, 2019, 26 pages.
"International Search Report and Written Opinion", Application No. PCT/US2019/027428, dated Jun. 13, 2019, 9 pages.
"Non-Final Office Action", U.S. Appl. No. 15/953,777, dated Jan. 21, 2020, 26 pages.
10-2020-7022290, "Foreign Notice of Allowance", Korean Application No. 10-2020-7022290, dated Jun. 27, 2022, 5 pages.
10-2020-7022290, "Office Action Received for Korean Patent Application No. 10-2020-7022290, dated Dec. 17, 2021", dated Dec. 17, 2021, 5 Pages.
U.S. Appl. No. 15/953,777, "Applicant Initiated Interview Summary Received for U.S. Appl. No. 15/953,777, dated Dec. 17, 2020", dated Dec. 17, 2020, 3 Pages.
U.S. Appl. No. 15/953,777, "Applicant Initiated Interview Summary Received for U.S. Appl. No. 15/953,777, dated Jul. 28, 2020", dated Jul. 28, 2020, 3 Pages.
U.S. Appl. No. 15/953,777, "Applicant Initiated Interview Summary Received for U.S. Appl. No. 15/953,777, dated Mar. 11, 2020", dated Mar. 11, 2020, 3 Pages.
U.S. Appl. No. 15/953,777, "Corrected Notice of Allowability", U.S. Appl. No. 15/953,777, dated Oct. 17, 2022, 3 pages.
U.S. Appl. No. 15/953,777, "Final Office Action Received for U.S. Appl. No. 15/953,777, dated Feb. 4, 2022", dated Feb. 4, 2022, 29 Pages.
U.S. Appl. No. 15/953,777, "Final Office Action received for U.S. Appl. No. 15/953,777, dated Mar. 22, 2021", dated Mar. 22, 2021, 25 Pages.
U.S. Appl. No. 15/953,777, "Non Final Office Action Received for U.S. Appl. No. 15/953,777, dated May 7, 2021", dated May 7, 2021, 23 Pages.
U.S. Appl. No. 15/953,777, "Non Final Office Action Received for U.S. Appl. No. 15/953,777, dated Oct. 16, 2020", dated Oct. 16, 2020, 21 Pages.
U.S. Appl. No. 15/953,777, "Non-final Office Action received for U.S. Appl. No. 15/953,777, dated Jul. 30, 2021", dated Jul. 30, 2021, 21 Pages.
U.S. Appl. No. 15/953,777, "Notice of Allowance", U.S. Appl. No. 15/953,777, dated Oct. 5, 2022, 16 pages.
19720744.2, "Communication Pursuant to Article 94(3) EPC", European Patent Application No. 19720744.2, dated Jun. 29, 2022, 6 pages.
Anonymous, "Versionista Features", Retrieved from the Internet: URL:http://web.archive.org/web/20170606173127/ https://versionista.com/product-featur es.html (retrieved on Jun. 4, 2019), Jun. 6, 2017, 13 pages.
Degroot, Troy, "Bluebeam Document Compare/Overlay & Tip", Autodesk [retrieved Jul. 27, 2022]. Retrieved from the Internet: <https://knowledge.autodesk.com/search-result/caas/screencast/Main/Details/d3897468-a66f-49db-a75e-e9d0f1c2b899.html>, Mar. 3, 2017, 2 pages.
PCT/US2019/027428, "International Preliminary Report on Patentability Received for PCT Application No. PCT/US2019/027428, dated Oct. 29, 2020", 8 Pages.
201980025636.2 , "Foreign Office Action", CN Application No. 201980025636.2, Dec. 12, 2023, 15 pages.

* cited by examiner

SYSTEM AND METHOD FOR AGGREGATION AND COMPARISON OF MULTI-TAB CONTENT

CLAIM OF PRIORITY

This application is a continuation of and claims priority to U.S. patent application Ser. No. 15/953,777, filed Apr. 16, 2018, entitled "System and Method for Aggregation and Comparison of Multi-Tab Content," the entire disclosure of which is hereby incorporated by reference herein in its entirety.

TECHNICAL FIELD

The present application relates generally to user-interface enhancement and, in one example, the facilitation of user navigation in display screens. More specifically, embodiments of the invention relate to a system and method for aggregating content identified on a plurality of tabs in a browser and generating a display of a comparison of aspects of the aggregated data in a user interface.

BACKGROUND

Online user navigation typically involves opening a new browser window or tab to access fresh content. When searching online for a particular item, the user may open a number of tabs on their browser to compare and contrast items he or she may find online based on, for example, a model, a make, a size, a price, and so forth. The user may also open tabs for items that are provided from different websites. This process is manually driven, difficult, and can be very time-consuming. Often, the user may lose track of which tab or window includes the items he or she is interested in.

Accordingly, managing and viewing content on multiple tabs can be onerous for a user when seeking to compare various aspects of content included in each tab, especially when a detailed comparison of the content is required.

BRIEF DESCRIPTION OF THE DRAWINGS

Some embodiments are illustrated by way of example and not limitation in the figures of the accompanying drawings, in which.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other example embodiments of the invention exist and are within the scope of the invention, and logical, mechanical, electrical, and other changes may be made without departing from the scope or extent of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Generally, methods, apparatus, and systems for user-interface enhancement and, in one example, the facilitation of user navigation in display screens are disclosed. Online shoppers typically open multiple browser interfaces, such as browser tabs or browser windows (also known as tabs and windows, respectively, herein), of an Internet browser to view and compare different items. As a browser program is aware of the open browser interfaces, the content of the open browser interfaces can be accessed and the item descriptions on each page (such as a web page) can be retrieved to generate a comparison of items for the user. The comparison may be displayed, for example, as a table with a row for each item and a column for each feature, or the features of other identified items could be displayed as an overlay on the web page of the currently selected item or browser interface. The table may be displayed via a dedicated browser interface, as an overlay on the page of the currently selected item or browser interface, and the like. In one example embodiment, free text summaries of each compared item may be displayed in a browser interface, as an overlay on an open browser interface, and the like.

In one example embodiment, web pages containing descriptions of similar items for use in the comparison may be identified by a common URL domain; by metadata associated with the web page, item, browser interface, or any combination thereof; by an analysis of the item descriptions; or any combination thereof.

Figure 1A:
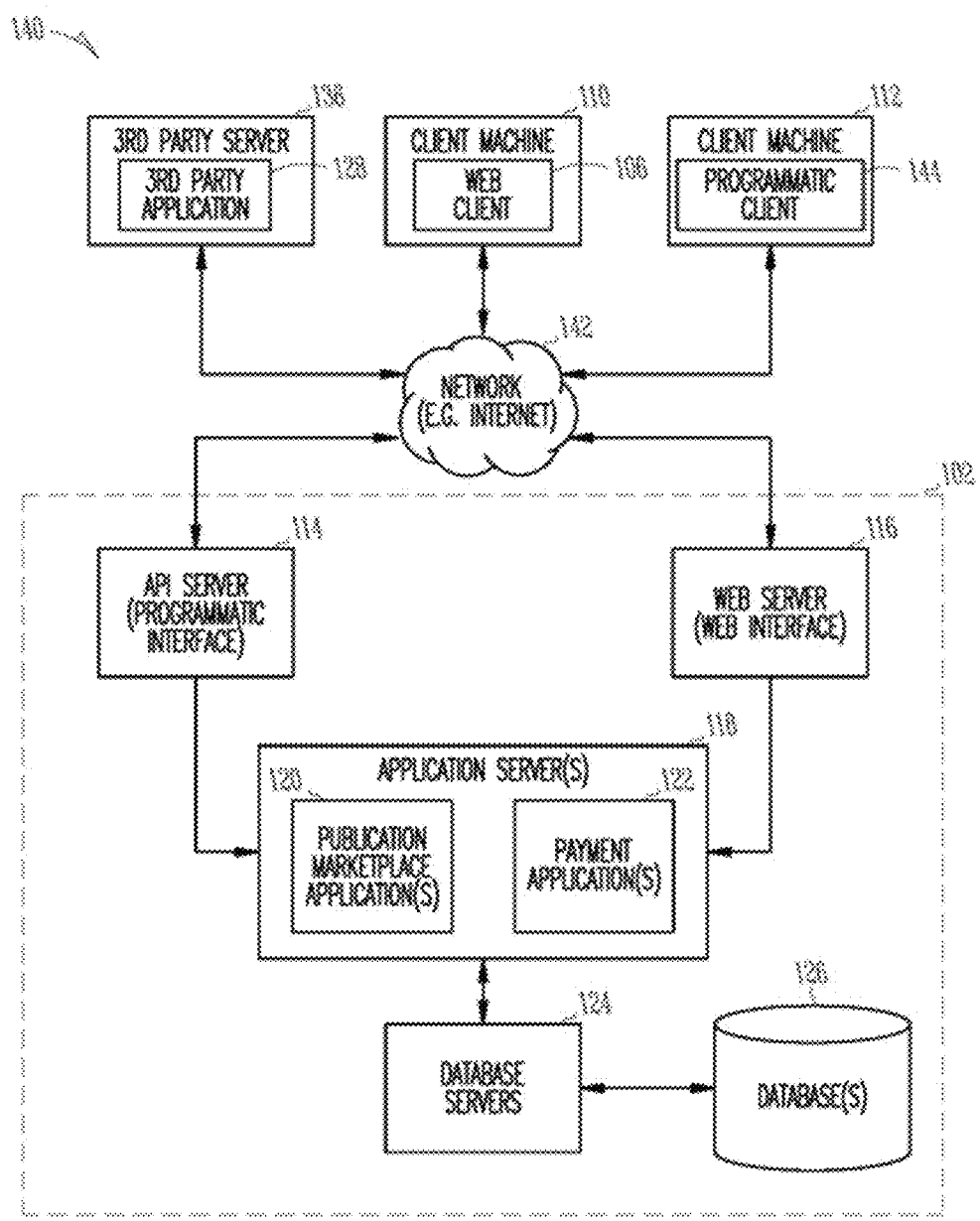
FIG. 1A is a network diagram depicting a client-server system, within which one example embodiment may be deployed.

FIG. 1A is a network diagram depicting a client-server system 140, within which one example embodiment may be deployed. A networked system 102, in the example form of a network-based publication system, provides server-side functionality, via a network 142 (e.g., the Internet or a wide area network (WAN)), to one or more clients. FIG. 1A illustrates, for example, a web client 106 (e.g., a browser, such as the Internet Explorer® browser developed by Microsoft® Corporation of Redmond, Wash. State) and a programmatic client 144 executing on respective client machines 110 and 112.

An application program interface (API) server 114 and a web server 116 are coupled to, and provide programmatic and web interfaces respectively to, one or more application servers 118. The application servers 118 host one or more publication marketplace applications 120 and payment applications 122. The application servers 118 are, in turn, shown to be coupled to one or more database servers 124 that facilitate access to one or more databases 126.

The publication marketplace applications 120 provide a number of publication functions and services to users who access the networked system 102. The payment applications 122 likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the publication marketplace applications 120. While the publication marketplace and payment applications 120 and 122 are shown in FIG. 1A to both form part of the networked system 102, it will be appreciated that, in alternative embodiments, the payment applications 122 may form part of a payment service that is separate and distinct from the networked system 102.

Further, while the client-server system 140 shown in FIG. 1A employs a client-server architecture, the embodiments are, of course, not limited to such an architecture, and could equally well find application in a distributed, or peer-to-peer, architecture system, for example. The various publication marketplace and payment applications 120 and 122 could also be implemented as standalone software programs, which do not necessarily have networking capabilities.

The web client 106 accesses the various publication marketplace and payment applications 120 and 122 via the web interface supported by the web server 116. Similarly, the programmatic client 144 accesses the various services and functions provided by the publication marketplace and payment applications 120 and 122 via the programmatic interface provided by the API server 114. The programmatic client 144 may, for example, be a seller application (e.g., the Turbo Lister application developed by eBay Inc., of San Jose, Calif.) to enable sellers to author and manage publications on the networked system 102 in an offline manner, and to perform batch-mode communications between the programmatic client 144 and the networked system 102.

FIG. 1A also illustrates a third-party application 128, executing on a third-party server machine 136, as having programmatic access to the networked system 102 via the programmatic interface provided by the API server 114. For example, the third-party application 128 may, utilizing information retrieved from the networked system 102, support one or more features or functions on a website hosted by the third party. The third-party website may, for example, provide one or more promotional, publication, or payment functions that are supported by the relevant applications of the networked system 102.

Figure 1B:
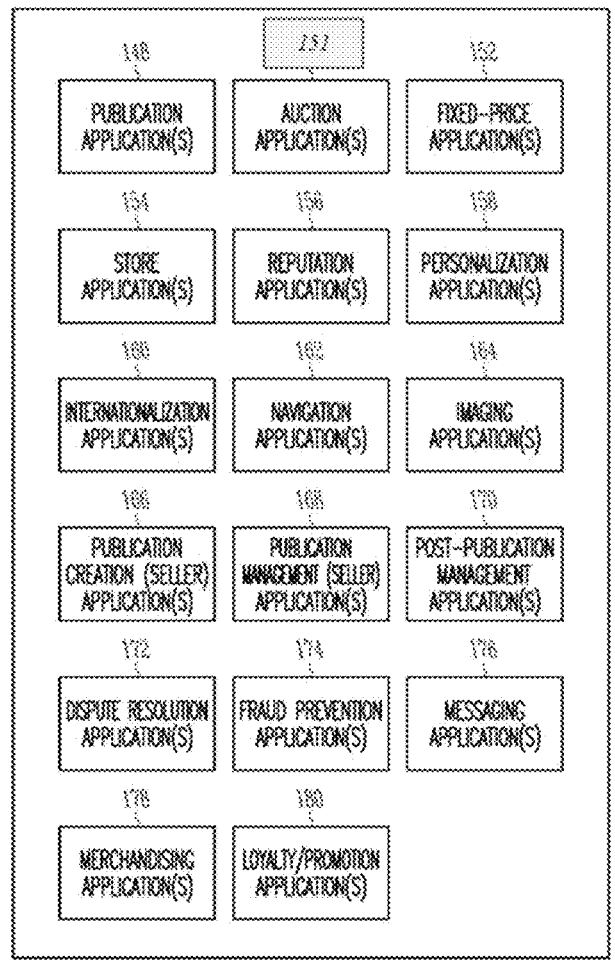
FIG. 1B is a block diagram illustrating example publication marketplace and payment applications, in accordance with an example embodiment.

FIG. 1B is a block diagram illustrating example publication marketplace and payment applications 120 and 122 that, in one example embodiment, are provided as part of application server(s) 118 in the networked system 102. The applications 120 and 122 may be hosted on dedicated or shared server machines (not shown) that are communicatively coupled to enable communications between server machines. The applications 120 and 122 themselves are communicatively coupled (e.g., via appropriate interfaces) to each other and to various data sources, so as to allow information to be passed between the applications 120 and 122 or so as to allow the applications 120 and 122 to share and access common data. The applications 120 and 122 may furthermore access one or more databases 126 via the database servers 124.

The networked system 102 may provide a number of publication and price-setting mechanisms whereby a seller may list (or publish information concerning) goods or services for sale, a buyer can express interest in or indicate a desire to purchase such goods or services, and a price can be set for a transaction pertaining to the goods or services. To this end, the publication marketplace and payment applications 120 and 122 are shown to include at least one publication application 148 and one or more auction applications 151, which support auction-format publication and price setting mechanisms (e.g., English, Dutch, Vickrey, Chinese, Double, Reverse auctions). The various auction applications 151 may also provide a number of features in support of such auction-format publications, such as a reserve price feature whereby a seller may specify a reserve price in connection with a publication and a proxy-bidding feature whereby a bidder may invoke automated proxy bidding.

A number of fixed-price applications 152 support fixed-price publication formats (e.g., the traditional classified advertisement-type publication or a catalogue publication) and buyout-type publications. Specifically, buyout-type publications (e.g., including the Buy-It-Now (BIN) technology developed by eBay Inc., of San Jose, Calif.) may be offered in conjunction with auction-format publications, and allow a buyer to purchase goods or services, which are also being offered for sale via an auction, for a fixed-price that is typically higher than the starting price of the auction.

Store applications 154 allow a seller to group publications within a "virtual" store, which may be branded and otherwise personalized by and for the seller. Such a virtual store may also offer promotions, incentives, and features that are specific and personalized to a relevant seller.

Reputation applications 156 allow users who transact, utilizing the networked system 102, to establish, build, and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 156 allow a user (e.g., through feedback provided by other transaction partners) to establish a reputation within the networked system 102 over time. Other potential trading partners may then reference such a reputation for the purposes of assessing credibility and trustworthiness.

Personalization applications 158 allow users of the networked system 102 to personalize various aspects of their interactions with the networked system 102. For example, a user may, utilizing an appropriate personalization application 158, create a personalized reference page at which information regarding transactions to which the user is (or has been) a party may be viewed. Further, a personalization application 158 may enable a user to personalize publications and other aspects of their interactions with the networked system 102 and other parties.

The networked system 102 may support a number of publications that are customized, for example, for specific geographic regions. A version of the networked system 102 may be customized for the United Kingdom, whereas another version of the networked system 102 may be customized for the United States. Each of these versions may operate as an independent publication or may be customized (or internationalized) presentations of a common underlying publication. The networked system 102 may accordingly include a number of internationalization applications 160 that customize information (or the presentation of information by the networked system 102) according to predetermined criteria (e.g., geographic, demographic or publication criteria). For example, the internationalization applications 160 may be used to support the customization of information for a number of regional websites that are operated by the networked system 102 and that are accessible via respective web servers 116.

Navigation of the networked system 102 is facilitated by one or more navigation applications 162. For example, a search application (as an example of a navigation application 162) enables keyword searches of publications published via the networked system 102. A browse application allows users to browse various category, catalogue, or inventory data structures according to which publications may be classified within the networked system 102. Various other navigation applications 162 may be provided to supplement the search and browsing applications.

In order to make publications available via the networked system 102 as visually informative and attractive as possible, the applications 120 and 122 include one or more imaging applications 164, which users utilize to upload images for inclusion within publications. The imaging application 164 also operates to incorporate images within viewed publications. The imaging applications 164 may also support one or more promotional features, such as image galleries that are presented to potential buyers. For example, sellers may pay an additional fee to have an image included within a gallery of images for promoted items.

Publication creation applications 166 allow sellers to conveniently author publications pertaining to goods or services that they wish to transact via the networked system 102, and publication management applications 168 allow sellers to manage such publications. Specifically, where a particular seller has authored or published a large number of publications, the management of such publications may present a challenge. The publication management applications 168 provide a number of features (e.g., auto-relisting, inventory level monitors) to assist the seller in managing such publications. One or more post-publication management applications 170 also assist sellers with a number of activities that typically occur post-publication. For example, upon completion of an auction facilitated by one or more auction applications 151, a seller may wish to leave feedback regarding a particular buyer. To this end, a post-publication management application 170 may provide an interface to one or more reputation applications 156, so as to allow the seller conveniently to provide feedback regarding multiple buyers to the reputation applications 156.

Dispute resolution applications 172 provide mechanisms whereby disputes arising between transacting parties may be resolved. For example, the dispute resolution applications 172 may provide guided procedures whereby the parties are guided through a number of steps in an attempt to settle a dispute. In the event that the dispute cannot be settled via the guided procedures, the dispute may be escalated to a third-party mediator or arbitrator.

A number of fraud prevention applications 174 implement fraud detection and prevention mechanisms to reduce the occurrence of fraud within the networked system 102.

Messaging applications 176 are responsible for the generation and delivery of messages to users of the networked system 102 (e.g., messages advising users regarding the status of publications at the networked system 102 (e.g., providing "outbid" notices to bidders during an auction process or to provide promotional and merchandising information to users)). Respective messaging applications 176 may utilize any one of a number of message delivery networks and platforms to deliver messages to users. For example, messaging applications 176 may deliver electronic mail (e-mail), instant message (IM), Short Message Service (SMS), text, facsimile, or voice (e.g., voice over IP (VoIP)) messages via the wired (e.g., the Internet), plain old telephone service (POTS), or wireless (e.g., mobile, cellular, WiFi, WiMAX) networks 142.

Merchandising applications 178 support various merchandising functions that are made available to sellers to enable sellers to increase sales via the networked system 102. The merchandising applications 178 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotion applications 180. For example, a buyer may earn loyalty or promotion points for each transaction established and/or concluded with a particular seller, and be offered a reward for which accumulated loyalty points can be redeemed.

Figure 1C:
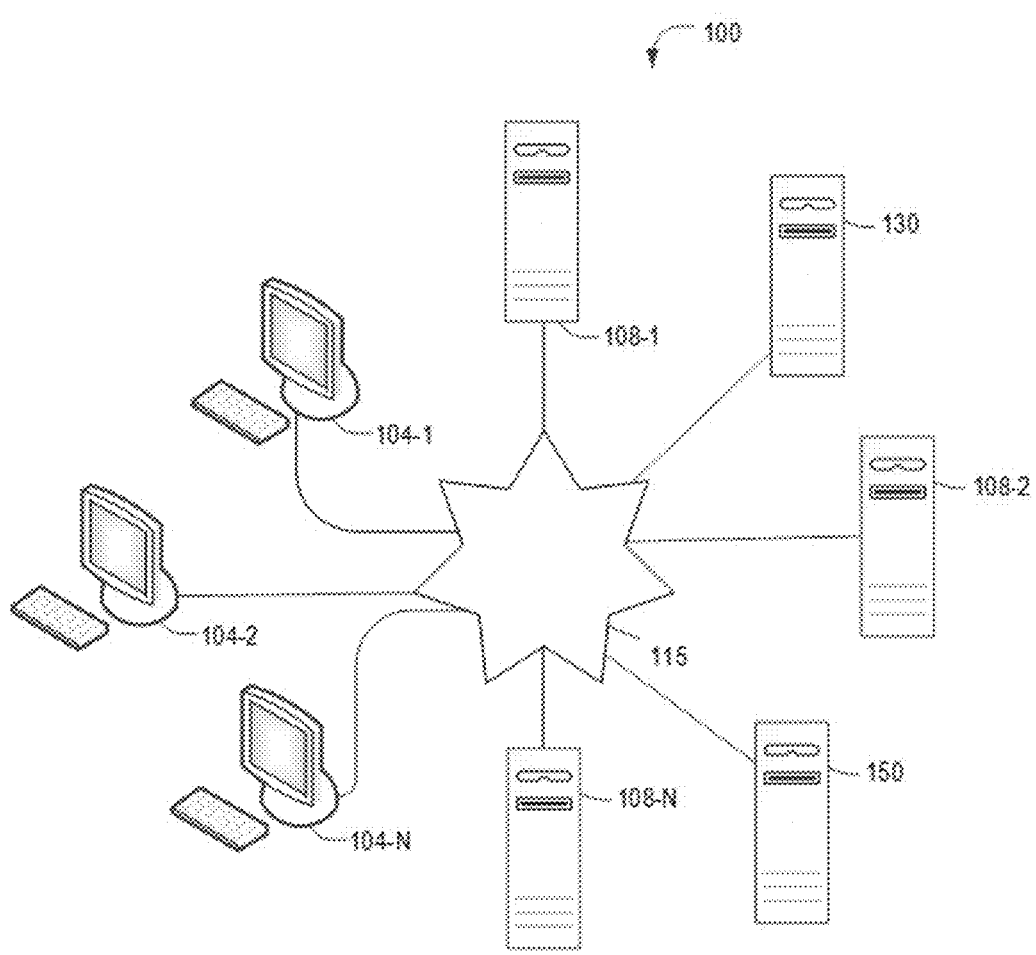
FIG. 1C shows a block diagram of an example system for aggregating and comparing multi-tab content in accordance with an example embodiment.

FIG. 1C shows a block diagram of an example system 100 for aggregating and comparing multi-tab content in accordance with an example embodiment. In one example embodiment, the system 100 comprises one or more user devices 104-1, 104-2 and 104-N (known as user devices 104 hereinafter), one or more seller processing systems 108-1, 108-2 and 108-N (known as seller processing systems 108 hereinafter), an item identification processing system 130, a comparison processing system 150, and a network 115.

In one embodiment, each of the user devices 104 in FIG. 1C may a client machine 110 in FIG. 1A and each of the seller processing systems 108 in FIG. 1C may be a client machine 112 in FIG. 1A. In one embodiment, the item identification processing system 130 and the comparison processing system 150 may be included in the application servers 118 in FIG. 1A.

Each user device (e.g., 104-1) may be a personal computer (PC), a mobile phone, a personal digital assistant (PDA), a refrigerator, an automobile, a camera, a network-connected device, or any other appropriate computer device. Each user device (104-1, 104-2, 104-N) may include a user interface module 308, described more fully below by way of example in conjunction with FIG. 3. In one example embodiment, the user interface module 308 may comprise a web browser program. Although a detailed description is only illustrated for user device 104-1, it is noted that each of the other user devices (e.g., user device 104-2 through user device 104-N) may have corresponding elements with the same functionality.

The seller processing systems 108, the item identification processing system 130, and the comparison processing system 150 may be a server, client, or other processing device that includes an operating system for executing software instructions. The seller processing systems 108 provide items for sale to a consumer, and may facilitate the search for and purchase of the items by a variety of consumers.

The network 115 may be a local area network (LAN), a wireless network, a metropolitan area network (MAN), a wide area network (WAN), a wireless network, a network of interconnected networks, the public switched telephone network (PSTN), and the like.

Each user device 104 may receive a query for item information from a user via an input device such as keyboard, mouse, electronic pen, etc. An item may comprise a product, a service, or both. The corresponding information may be in the form of an item publication.

The item identification processing system 130 of an online publication system may store and obtain information related to items available for sale. Each item publication may comprise a detailed description for the item, a picture of the item, attributes of the item, and the like. The item associated with the item publication may be a good or product (e.g., a tablet computer) or a service (e.g., a round of golf or appliance repair) that may be transacted (e.g., exchanging, sharing information about, buying, selling, making a bid on, and the like). The item publication may also include a title, a category (e.g., electronics, sporting goods, books, antiques, and the like), and attributes and tag information (e.g., color, size, and the like). The comparison processing system 150 generates a comparison of network-based content and item descriptions, as described more fully below by way of example in conjunction with FIGS. 4 and 5.

Referring back to the user device 104-1, the query received from the user of user device 104-1 may comprise one or more keywords. The user device 104-1 may transmit the query to the item identification processing system 130 via the network 115. The item identification processing system 130 may attempt to match the query keywords with the title, the category, the tag information, and/or any other field in the item publication using a search engine and may identify one or more item publications that satisfy the query. The item identification processing system 130 may retrieve and then sort the item publications in the search result in a known manner.

The search result list may comprise a list of available items of varying degrees of relevance to the particular product or product type for which the consumer is searching. The consumer may select from the search result list one or more items that correspond more closely to the consumer's search intention, for example, in order to obtain additional information on the item, or the consumer may apply one or more filters and may resubmit the query.

Figure 2:
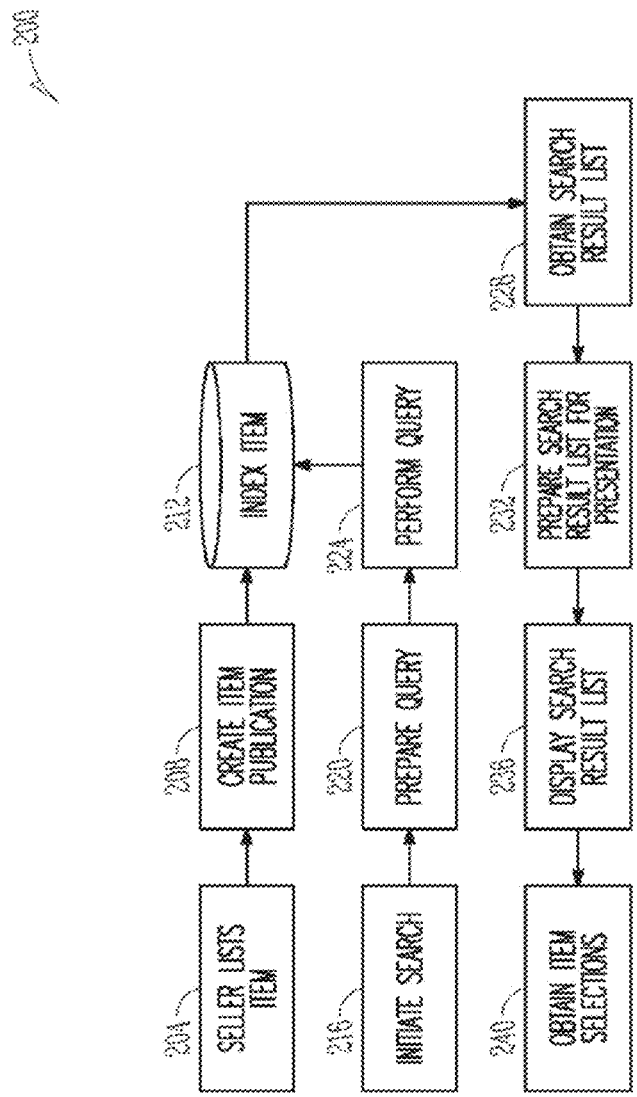
FIG. 2 shows a flowchart for an example method for publishing, indexing, and searching for a product or service, in accordance with an example embodiment.

FIG. 2 shows a flowchart for an example method 200 for publishing, indexing, and searching for a product or service, in accordance with an example embodiment. In one example embodiment, a seller may list an item for sale (operation 204). The seller may, for example, select a category for the item, submit a description of the item, submit a picture of the item, manually set attributes of the item, and the like. In one example embodiment, a seller simply requests that the device be listed for sale by, for example, clicking on a "sell this" icon.

An item publication is created in, for example, an item publication database (operation 208). The publication may include, for example, attributes of the item and terms of the sale offer. During the item publication operation 208, an identification number for the item publication may be assigned, and the publication may be authenticated and scanned to check for conformance with one or more publication policies. The listed item is indexed (operation 212) in a known manner to facilitate future searches for the item.

A consumer launches a search or query for one or more items (operation 216). For example, a consumer may initiate a search using the keywords "smartphone." A corresponding query is prepared (operation 220). For example, a spell check may be performed on the query terms and a search expression may be generated based on the provided search terms.

The query is executed on, for example, the items that have been indexed in the system (operation 224). For example, the prepared query is matched against the index that was updated during operation 212.

In response to the execution of the query, a search result list is obtained (operation 228). The search result list may be analyzed and an auto-filter mechanism may be enabled or disabled based, for example, on the obtained search result list. For example, the auto-filter mechanism may be enabled if the count of items in the search result list exceeds a threshold value or if the auto-filter mechanism has been enabled by a user.

The search result list is prepared for presentation (operation 232). For example, the search result list may be filtered, sorted, ranked, or formatted based, for example, on the analysis of the search result list performed and based on an identified set of search filters.

The prepared search result list is displayed (operation 236). In response to reviewing the displayed search result list, one or more item selections from one or more displayed item pages may be obtained from a user (operation 240).

The user device 104 may be used by a user, such as a customer, to conduct a search for a product, service, and the like; to view search results; and to request generation of and access to a comparison of item descriptions.

Figure 3:
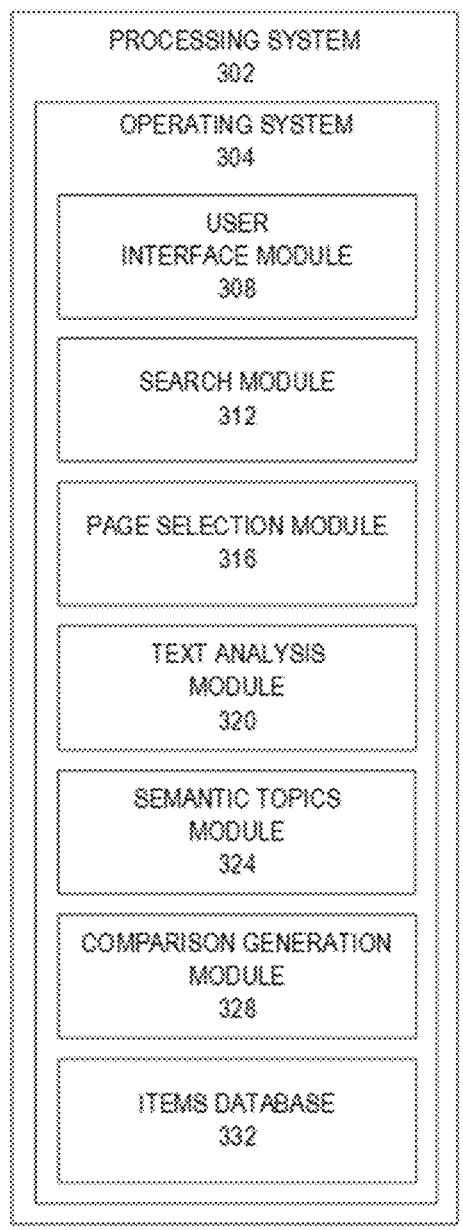
FIG. 3 is a block diagram of an example apparatus for aggregating and comparing multi-tab content in accordance with an example embodiment.

FIG. 3 is a block diagram of an example apparatus 300 for aggregating and comparing multi-tab content in accordance with an example embodiment. In some embodiments, the apparatus 300 may include the item identification processing system 130 and/or the comparison processing system 150 in FIG. 1C. In one embodiment, the apparatus 300 is included in the one or more application servers 118 in FIG. 1A. In other embodiments, the apparatus 300 is included in each user device (e.g., 104-1) in FIG. 1C. In some embodiments, the elements of apparatus 300 illustrated in FIG. 3 are included in a combination of: the item identification processing system 130, the comparison processing system 150, and any one of the user devices (e.g., 104-1).

Referring back to FIG. 3, the apparatus 300 is shown to include a processing system 302 that may be implemented on a server, client, or other processing device that includes an operating system 304 for executing software instructions. In accordance with an example embodiment, the processing system 302 may include a user interface module 308, a search module 312, a page selection module 316, a text analysis module 320, a semantic topics module 324, a comparison generation module 328, and an items database 332. In one example embodiment, the apparatus 300 may implement the user device 104, or the comparison processing system 150.

The user interface module 308 provides an interface for conducting a search for a product, service, and the like; for viewing search results; and for requesting the generation of and access to a comparison of network-based content and item descriptions. A user may enter a description of or keywords associated with a product or service via the interface and an item description(s) may be obtained and presented via a browser interface. The item description may be obtained from the search module 312.

The search module 312 obtains a description of or keywords associated with a product, service, or both via the user interface module 308, and conducts a query of, for example, the seller processing systems 108 or the item identification processing system 130, for the product, service, or both. The search results may be presented to a user via the user interface module 308 as, for example, a list of available items. The user may select one of the items from the list to trigger the generation of a browser interface that features a webpage and an item description for the corresponding item.

The page selection module 316 selects the browser interface to be used in the generation of the comparison. The user may select the browser interface via the user interface module 308, the page selection module 316 may automatically select the browser interface, or both. The automatic selection of the browser interface may be performed by searching for similar items based on the information provided by the text analysis module 320, the semantic topics module 324, or both. The automatic search may be for items that were listed in the search result list, items that are similar to items that were listed in the search result list, items that are similar to the items described in the browser interface(s) selected by the user, and the like.

The text analysis module 320 analyzes a webpage to determine the item described on the webpage, various features of the item, and the like. The topic(s) and semantic structure of the textual content of the webpage may be determined using machine learning and natural language processing, as described more fully below (the topic may be defined by a cluster of words that capture the topic).

The semantic topics module 324 determines a unique set of semantic topics for the content of each browser interface. The semantic topics module 324 may also determine a unique set of semantic topics for a particular sentence(s) of the content of each browser interface. The semantic topic may identify the type, model, brand, and the like of the item described on the webpage or one or more features of the item. In one example embodiment, a topic model (also known as a statistical model or a probabilistic topic model) is used to determine the topic of the webpage based, for example, on the frequency of occurrence of different words in the review. For example, the frequency of occurrence of the words "lens," "battery," "microphone," and "speaker" may vary based on whether the content describes a camera or a smart phone that includes a camera. Moreover, the relative frequency of the cited words may indicate the features described in the webpage. The semantic topic(s) may be stored in the items database 332.

The comparison generation module 328 compiles a comparison of various features of the items described on the selected browser interface(s) based on, for example, the semantic topic identified by the semantic topics module 324. The comparison may be in the form of a table, free-form text, and the like. The compiled comparison may be stored in the items database 332.

Figure 4:
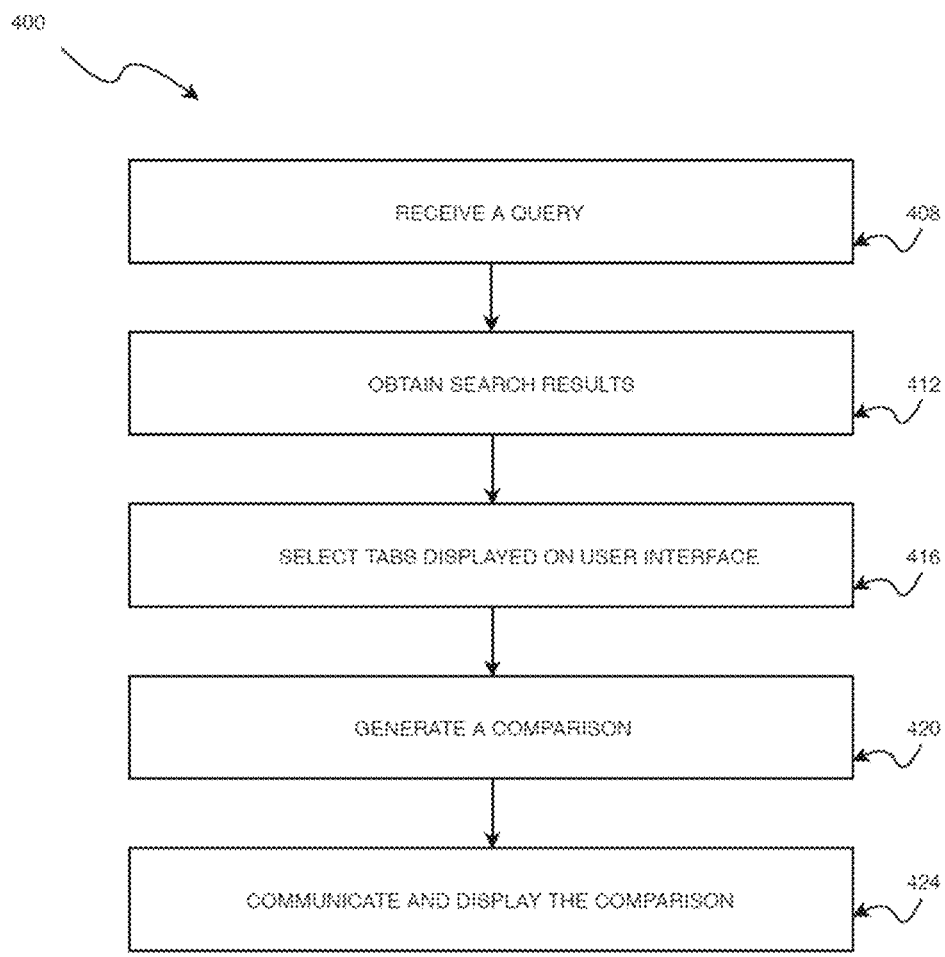
FIG. 4 is a diagram of a workflow for aggregating and comparing multi-tab content in accordance with an example embodiment.

FIG. 4 is a diagram of a workflow 400 for aggregating and comparing multi-tab content in accordance with an example embodiment.

Figure 6A:
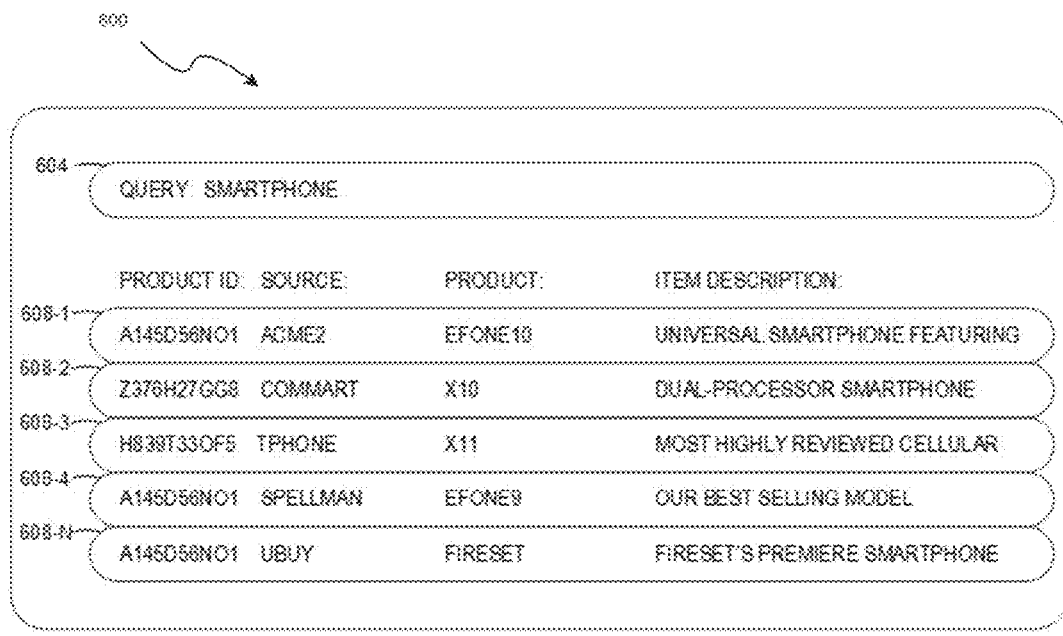
FIG. 6A-6C illustrates an example user interface for conducting a product or service query (FIG. 6A-6B) and an example of a user interface for displaying the results of the query including a comparison browser interface (FIG. 6C), in accordance with an example embodiment.
Figure 6B:
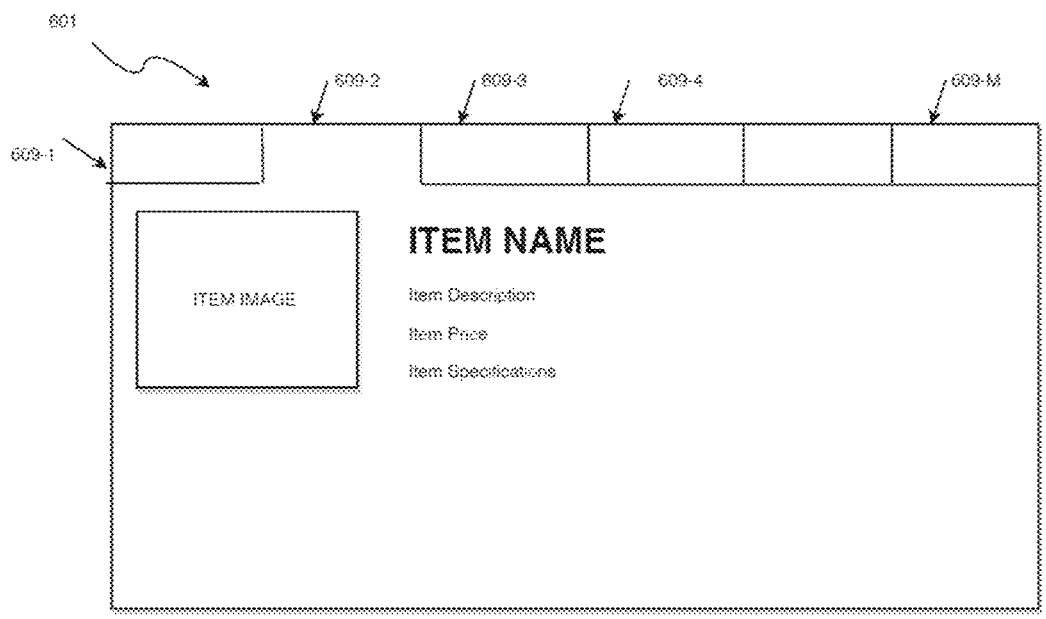

In one example embodiment, the apparatus 300 receives a query (operation 408), such as a query for a product or service. The query may be submitted by a user via, for example, the user interface module 308. In one embodiment, the query is a query designated for application server(s) 118 in the networked system 102. The query may be initiated by the search module 312 (operation 408), as described more fully above in conjunction with FIG. 3. The search results are obtained from the seller processing systems 108 or the item identification processing system 130 and displayed via the user interface module 308 (operation 412). FIG. 6A illustrates an example user interface 600 for conducting a product or service query, in accordance with an example embodiment. A query field 604 may be used to enter a query for a product or service. The query may be a text-based query for, for example, a smartphone product. One or more items may be identified via a table where each row 608-1, . . . 608-N corresponds to an item and includes an item identifier (product ID), an identifier for the source of the item description (such as a website), an item title (product), an item or product description, and the like. In some embodiments, the user interface 600 is generated by the user interface module 308, the user device 104, or a combination thereof. As shown in FIG. 6A, the search results may comprise, for example, a single line of a table for each identified item, where each line identifies the name of the product (including brand and model number) and, for example, a hyperlink to the webpage that describes the item. A user may select one or more of the hyperlinks to instantiate a browser interface for displaying the webpage of the selected item. In some instances, the user may select and open the one or more hyperlinks in separate tabs on the browser interface 600 or separate windows (not shown) of the browser interface. FIG. 6B illustrates an example user interface 601 that includes a plurality of tabs 609-1, . . . , 609-M (M>1). Each of the tabs 609-1, . . . , 609-M displays a webpage for a different selected item. For example, a user searching for washing machines may open a different tab for each of the washing machines that he is considering. Users may thus perform comparison-shopping using the multiple tabs. Instead of selecting and opening a hyperlink on a separate tab, the user may also have submitted another query on a separate tab (e.g., 609-2) for the same item (e.g., washing machines) and opened one or more hyperlinks on that separate tab (e.g., 609-2) or a different tab (e.g., 609-3).

In some embodiments, in addition to the user having submitted a query to the apparatus 300 designated for the application server(s) 118 in the networked system 102 (e.g., a first marketplace website), the user may have submitted his query to a separate server via a separate marketplace website. In this example, one of the tabs (e.g., 609-4) may be displaying the separate marketplace website. Accordingly, the tabs 609-1, . . . , 609-M in FIG. 6B may include queries sent to different marketplace websites. The user may thus have submitted queries for the item (e.g., washing machine) on different marketplace websites open in different tabs of the browser interface 601. In this example, the browser interface includes a plurality of tabs 609-1, . . . , 609-M of the browser interface 601 displaying washing machines that are being sold by various different merchants and hosted by different systems 102. In this example, at least one of the plurality of tabs (e.g., 609-1) of the browser interface 601 is the website associated with the application server(s) 118 in the networked system 102.

Referring back to FIG. 3, apparatus 300 selects tabs (or windows) displayed on the user interface 601 (operation 416) in FIG. 6B, to generate a comparison of the products for the user (operation 420). In one embodiment, the apparatus 300 generates the comparison automatically in response to detecting the user's browser interface 601 includes two or more tabs (or windows) displaying items of the same type (e.g., different models of washing machines).

In one embodiment, to select tabs to generate a comparison, the apparatus 300 determines type of item that is associated with the tabs 609-1, . . . , 609-M. The apparatus 300 may determine the type of item using, for example, the Uniform Resource Locator (URL) address of the webpage being displayed in the tab, the text description of the webpage being displayed in the tab, the image or images included in the webpage being displayed in the tab, etc. In one embodiment, the apparatus 300 may determine the type of item using keywords included in the webpage. For example, the keywords may be hashtagged keywords (e.g., hashtags), or tagged keywords (e.g., tags) included in the webpage.

The apparatus 300 may also determine a plurality of different types of items. For example, the user may be searching for washing machines and mobile phones. Accordingly, some of the tabs may display different models of washing machines while other tabs may display different models of mobile phones. In this embodiment, the apparatus 300 may select two groups of tabs: the first group of tabs is associated with washing machines and the second group of tabs is associated with mobile phones. In another embodiment, the user may actively select the one or more of the browser interfaces for the generation of the comparison (operation 416).

In another embodiment, in addition to detecting that the user's browser interface 601 includes two or more tabs (or windows) displaying items of the same type, the apparatus 300 may assess the user's online footprint using data from the website. For example, the apparatus 300 may determine that the user's online footprint indicates that the user has been navigating to various websites associated with a specific type of item (e.g., washing machines). The data from the website may include session data or information, cookies, or online navigation data stored in the user's device's local memory, etc.

The apparatus 300 then creates a comparison of the item descriptions corresponding to the selected tabs (operation 420). The comparison created may include a chart or table displaying features of each item of the same type. The features of each item in the comparison may be features important to the user who is comparing and contrasting the items of the same type for sale. For example, the features of each item in the comparison may include the model, the make, the size, the price, etc. In one embodiment, when the apparatus 300 selected more than one group of tabs in operation 416, the apparatus 300 creates comparisons for each of the groups of tabs selected. For example, the apparatus 300 generates a comparison for the first group of tabs associated with washing machines and generates a separate comparison for the second group of tabs associated with mobile phones.

In one embodiment, the apparatus 300 may determine that a website includes a plurality of items of the same type within the same webpage (e.g., a search result listing page). In this embodiment, the apparatus 300 may select two or items of the same type within the same webpage and generate the comparison of the selected items.

Figure 6C:
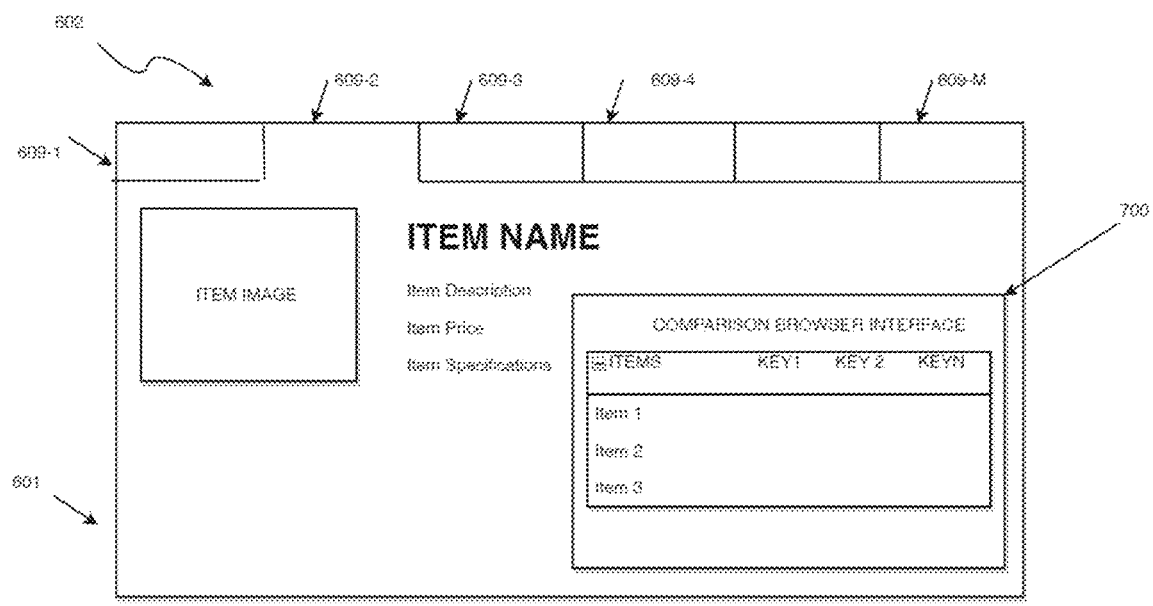

The apparatus 300 then causes the comparison to be communicated to the user device 104 and to be displayed on the user device 104 (operation 424). The comparison may be displayed on a comparison browser interface (FIG. 7), or may be displayed as an overlay on an existing browser tab or window (FIG. 6C). In one embodiment, the comparison displayed on the user's device 104 may be saved by the user on the user's device 104, may be sent to another electronic device from the user's device 104 via electronic communication (e.g., email, direct message or chat services, SMS, etc.), or shared with another electronic device from the user's device 104 using a social media platform.

Figure 7:
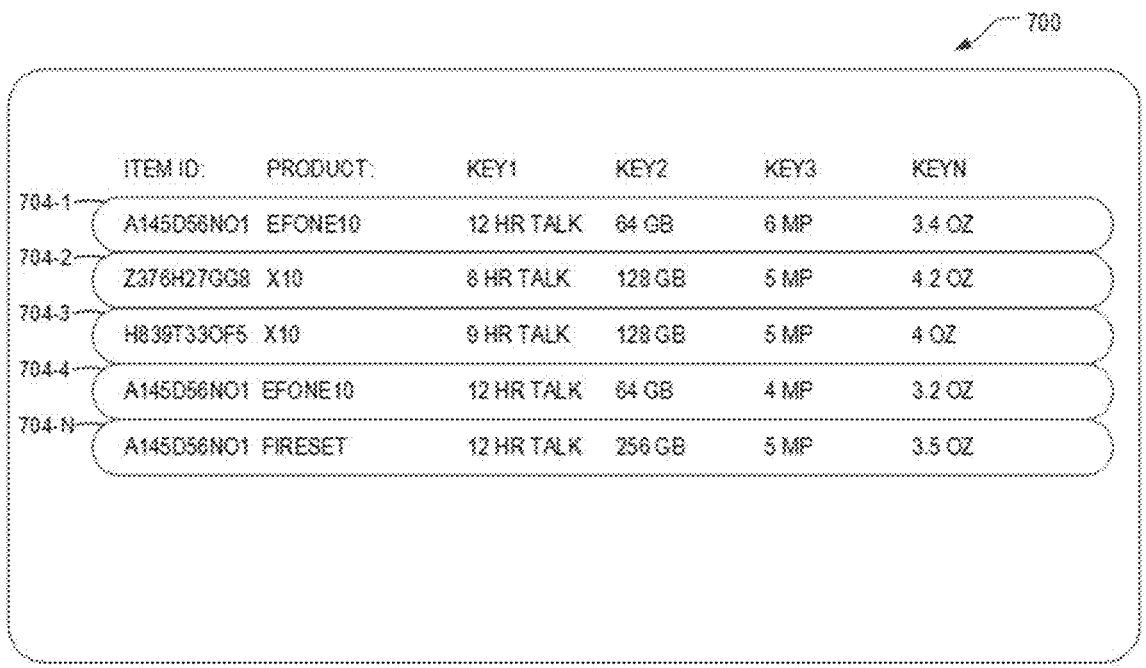
FIG. 7 illustrates an example user interface displaying the comparison browser interface, in accordance with an example embodiment.

FIG. 7 illustrates an example user interface 700 for viewing the comparison browser interface, in accordance with an example embodiment. The comparison browser interface 700 may display the comparison created in operation 420. As shown in FIG. 7, the comparison browser interface 700 displays a table having a row 704-1, . . . 704-N corresponding to each item from the selected tabs. Each row 704 may include an item identifier or image, an item name, and information regarding one or more features of the corresponding item. In FIG. 7, items from the selected tabs in FIG. 6B are mobile phones and the features may include the battery duration (e.g., Key1: minutes/hours of talk time), the amount of memory (e.g., Key2: Gigabytes), the number of pixels in the mobile phone's camera (e.g., Key3: Mega-Pixels), and the weight of the mobile phone (e.g., KeyN: Oz). While not illustrated, other key features may include the model, the make, the size, the dimensions, the price, the identification of the seller or seller's website, whether the item is new or used, etc. In one example embodiment, the comparison browser interface 700 is generated by the user interface module 308, the user device 104, or a combination thereof. The comparison browser interface 700 in FIG. 7 may be displayed as a separate window or on a separate tab. When more than one comparison is created in operation 420, the apparatus 300 causes the display of each of the comparisons that are created in a separate comparison browser interface 700.

As shown in FIG. 6C, the example user interface 602 illustrates that the comparison browser interface 700 may be displayed as an overlay to user interface 601. In one embodiment, the user interface 601 on which the comparison browser interface 700 is overlaid is a webpage associated with application server(s) 118 in the networked system 102. For example, in FIG. 6C, the tab 609-1 of the browser interface 601 is the website associated with the application server(s) 118 in the networked system 102. The tab 609-1 may be displaying the webpage of the selected item or the webpage listing the results of the query, which includes a plurality of items associated with the query. In this example, the tab 609-1 further displays the comparison browser interface 700 as an overlay (FIG. 6C). When more than one comparison is created in operation 420, the apparatus 300 causes the display of each of the comparisons that are created in a separate comparison browser interface 700. For example, the comparison of the washing machines may be displayed in comparison browser interface 700 that is overlaid on a tab 609-1 that is associated with washing machines while the comparison of the mobile phones may be displayed in comparison browser interface 700 that is overlaid on a tab 609-3 that is associated with mobile phones. In these embodiments, the user may refer to the comparison browser interface 700 to keep track efficiently of the items that he is considering for each type of item for which he is shopping.

Figure 5:
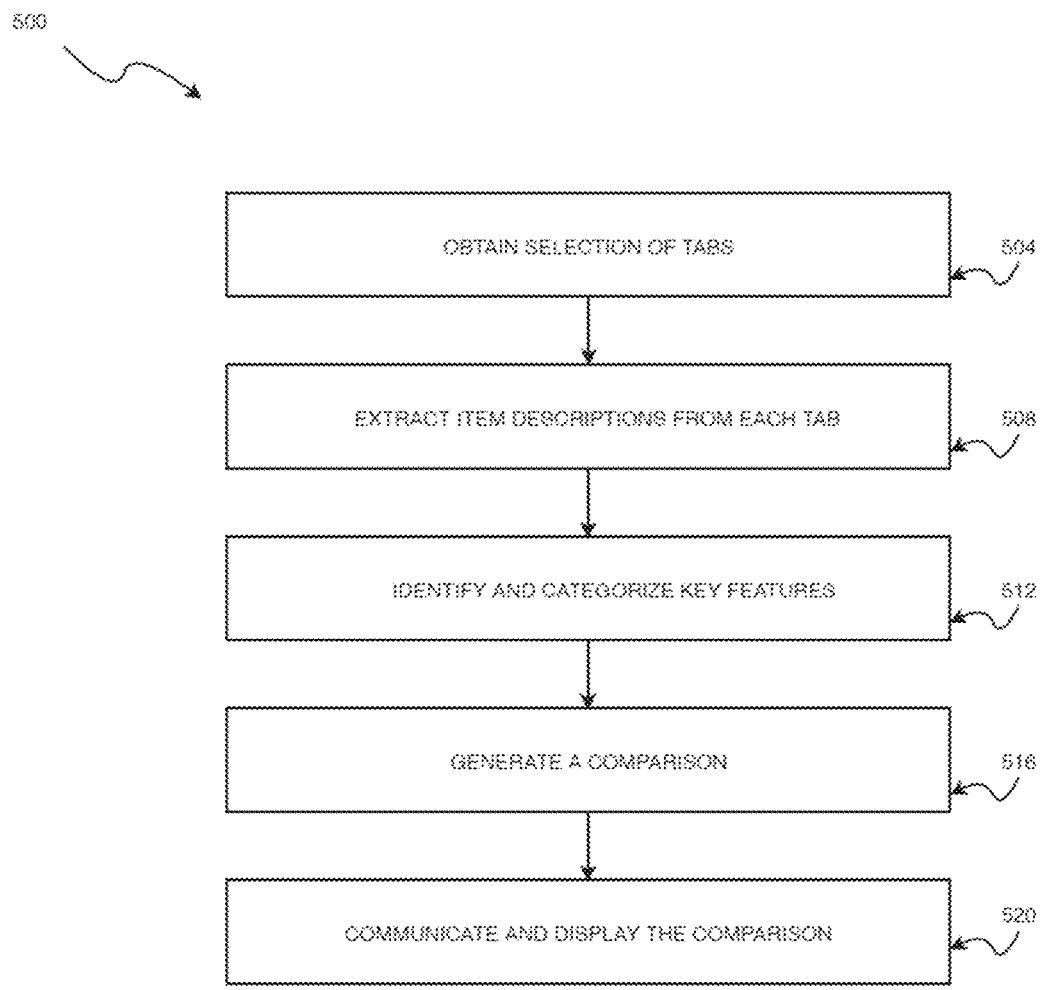
FIG. 5 is a flowchart for an example method for selecting tabs, creating a comparison and communicating the comparison from operations 416, 420 and 424 from FIG. 4, in accordance with an example embodiment.

FIG. 5 is a flowchart for an example method 500 for selecting tabs, creating a comparison and communicating the comparison from operations 416, 420 and 424 from FIG. 4, in accordance with an example embodiment. In one example embodiment, one or more of the operations of the method 500 may be performed by the user interface module 308, the search module 312, the page selection module 316, the text analysis module 320, the semantic topics module 324, and the comparison generation module 328, or any combination thereof.

In one embodiment, the apparatus selects or obtains a selection of one or more tabs (operation 504). As discussed in operation 416, the selection may be obtained from a user via the user interface module 308 or may be automatically generated by the page selection module 316. The selection may identify all open tabs and windows, may identify all open tabs and windows that contain item descriptions, may identify all open tabs and windows that contain item descriptions associated with a selected item, or may identify all open tabs and windows that contain item descriptions associated with a selected item or an item similar to the selected item.

Further to operation 420 in FIG. 4, the apparatus 300 extracts the item description associated with each selected browser interface from the webpage being displayed on the corresponding tab (operation 508). The item description may be identified by a header in the content of the browser interface, by a text in the content of the browser interface, by metadata associated with the browser interface, and the like. In one example embodiment, the entire contents of the selected browser interface may be considered to be the item description.

Further to operation 420 in FIG. 4, the apparatus 300 identifies the key features of each extracted item description and categorizes the identified key features by feature type (operation 512). In one example embodiment, the semantic topics module 324 uses, for example, a statistical model or a probabilistic topic model to identify semantic topics of the item description that may be considered features of the item, as described more fully above. In one example embodiment, each type of item (such as a laptop computer, smart watch, and the like) has a corresponding list of key features stored, for example, in the items database 332. The list of key features may be used to search for the relevant features in the extracted item description, corresponding list of key features, or both. For example, the list of features for a smartphone may include screen size, storage capacity, operating system, battery life and the like. The item description and identified semantic topics may then be searched for each type of feature.

In one example embodiment, the key features are extracted from metadata associated with the browser interface, the item description, and the like of the item. The metadata associated with a webpage may include key features, such as the price, shipping cost, category, color, weight, material, and the like. For example, the metadata associated with a webpage may be the text string:

Price: "98.99", Shipping: "Free", Category: "Flatware & Silverware",Color:"Gold",Weight:"4.35",Material: "Stainless Steel"

In another embodiment, extracting the key features may also include image extraction from the browser interface and analyzing the image extracted to determine the key features of the items.

Further to operation 420 in FIG. 4, the apparatus 300 then generates a table that is populated with a description corresponding to each key feature. Each row of the table corresponds to a type of feature and each column corresponds to the feature details from one of the extracted item descriptions (operation 516). Further to operation 424 in FIG. 4, the table is communicated to the user device 104 for display (operation 520).

Although certain examples are shown and described here, other variations exist and are within the scope of the invention. It will be appreciated, by those of ordinary skill in the art, that any arrangement, which is designed or arranged to achieve the same purpose, may be substituted for the specific embodiments shown. This application is intended to cover any adaptations or variations of the example embodiments of the invention described herein. It is intended that this invention be limited only by the claims, and the full scope of equivalents thereof.

Figure 8:
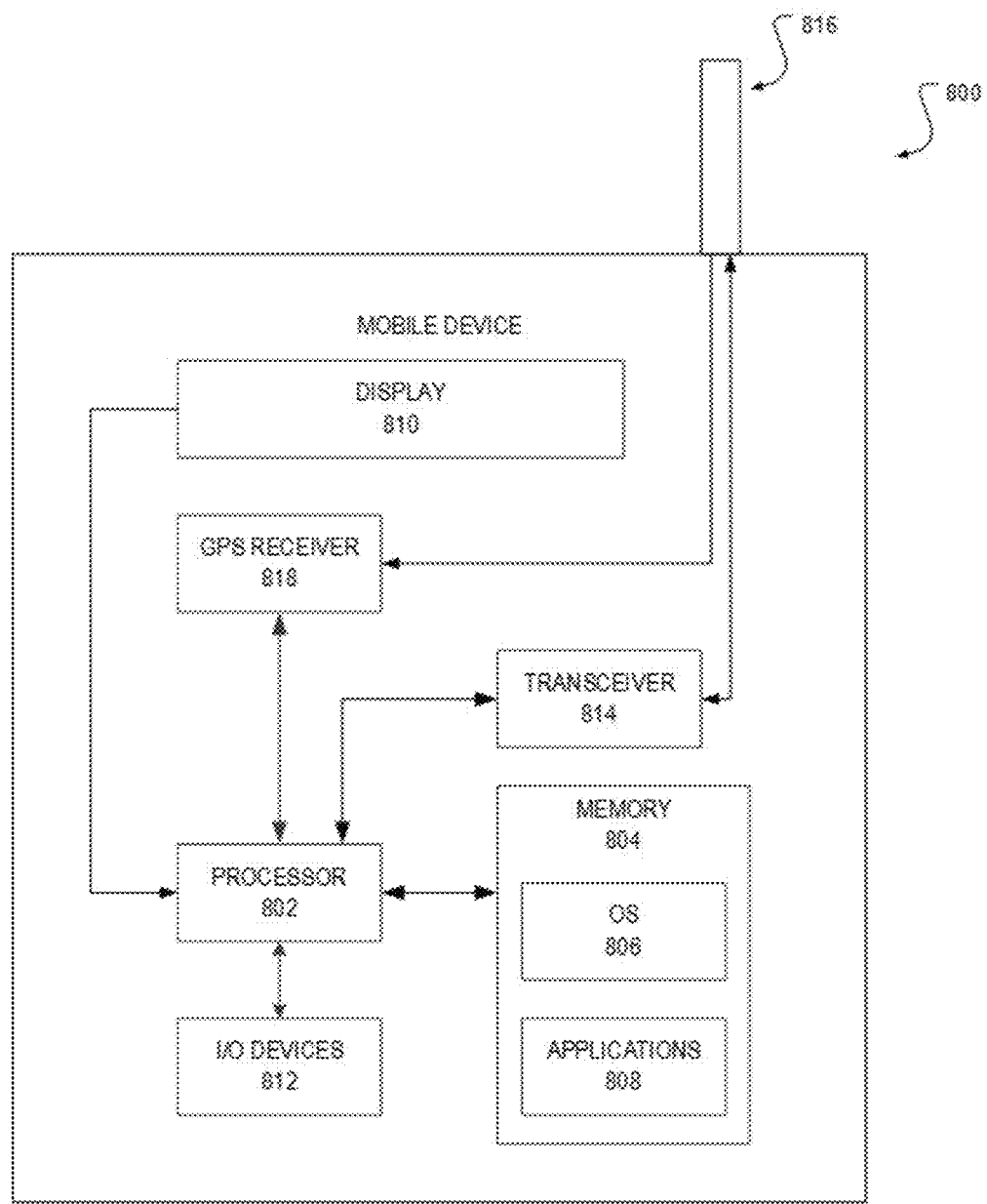
FIG. 8 is a block diagram illustrating an example mobile device, according to an example embodiment.

FIG. 8 is a block diagram illustrating an example mobile device 800, according to an example embodiment. The mobile device 800 may include a processor 802. The processor 802 may be any of a variety of different types of commercially available processors suitable for mobile devices (e.g., an XScale architecture microprocessor, a microprocessor without interlocked pipeline stages (MIPS) architecture processor, or another type of processor 802). A memory 804, such as a random access memory (RAM), a flash memory, or another type of memory, is typically accessible to the processor 802. The memory 804 may be adapted to store an operating system (OS) 806, as well as application programs 808, such as a mobile location-enabled application that may provide location-based services (LBSs) to a user. The processor 802 may be coupled, either directly or via appropriate intermediary hardware, to a display 810 and to one or more input/output (I/O) devices 812, such as a keypad, a touch panel sensor, a microphone, and the like. Similarly, in some embodiments, the processor 802 may be coupled to a transceiver 814 that interfaces with an antenna 816. The transceiver 814 may be configured to both transmit and receive cellular network signals, wireless data signals, or other types of signals via the antenna 816, depending on the nature of the mobile device 800. Further, in some configurations, a GPS receiver 818 may also make use of the antenna 816 to receive GPS signals.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Figure 9:
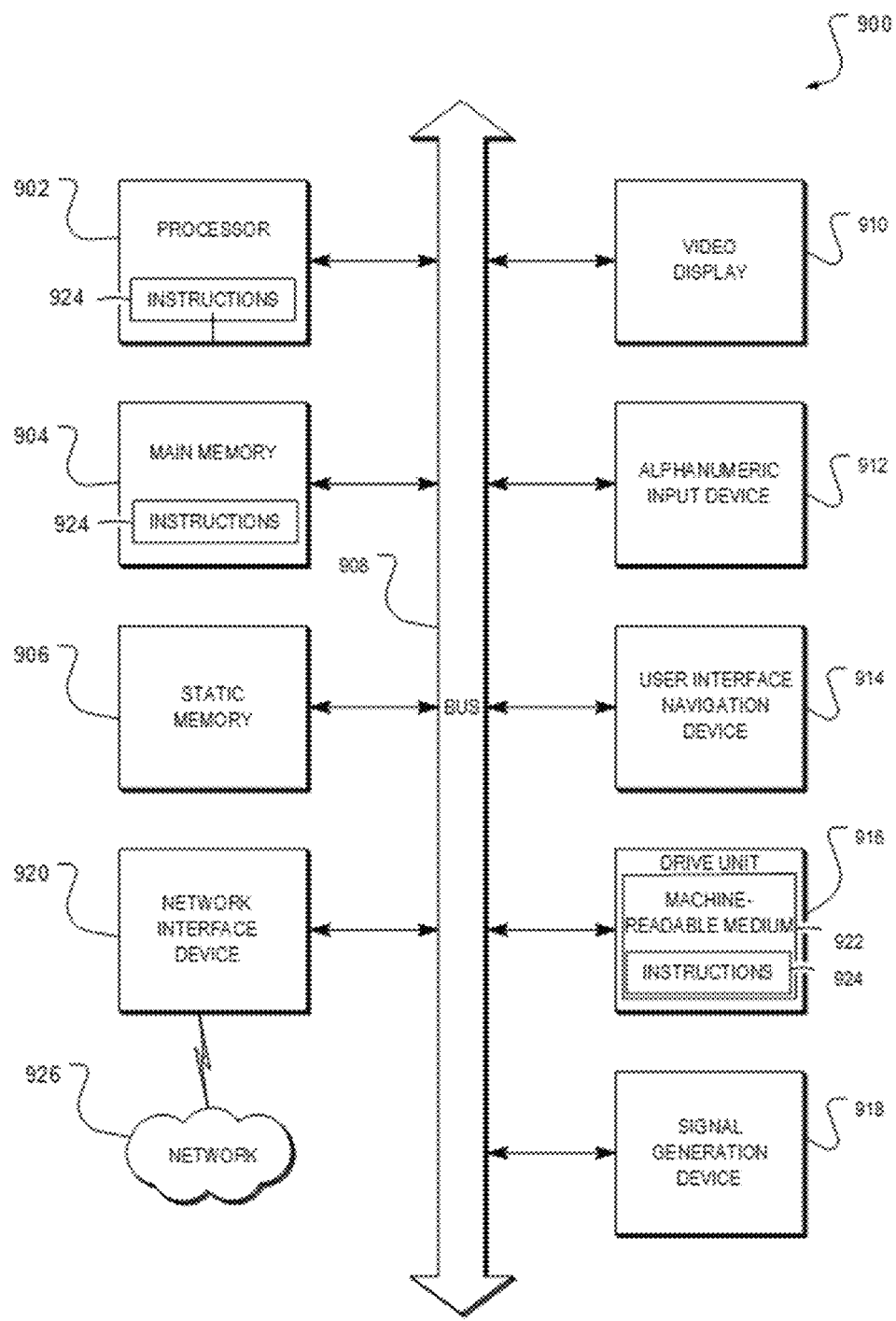
FIG. 9 is a block diagram of a machine within which instructions may be executed for causing the machine to perform any one or more of the methodologies discussed herein.

FIG. 9 is a block diagram of a machine in the example form of a computer system 900 within which instructions may be executed for causing the machine to perform any one or more of the methodologies discussed herein. In one example embodiment, the machine may be the example apparatus 300 of FIG. 3 for generating a comparison of network-based content and item descriptions. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation (or cursor control) device 914 (e.g., a mouse), a disk drive unit 916, a signal generation device 918 (e.g., a speaker), and a network interface device 920.

The drive unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media 922. The instructions 924 may also reside within the static memory 906.

While the machine-readable medium 922 is shown in an example embodiment to be a single medium, the term "machine-readable medium" may include a single medium or multiple media (e.g., a centralized or distributed database, and/or associated caches and servers) that store the one or more data structures or instructions 924. The term "machine-readable medium" shall also be taken to include any tangible medium that is capable of storing, encoding, or carrying the instructions 924 for execution by the machine and that cause the machine to perform any one or more of the methodologies of the present invention, or that is capable of storing, encoding, or carrying data structures utilized by or associated with such instructions 924. The term "machine-readable medium" shall accordingly be taken to include, but not be limited to, solid-state memories, and optical and magnetic media. Specific examples of machine-readable media 922 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

A "machine-readable medium" may refer to a single storage apparatus or device, as well as cloud-based storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof. In some embodiments, a "machine-readable medium" may also be referred to as a "machine-readable storage device."

Furthermore, the machine-readable medium 922 is non-transitory in that it does not embody a propagating or transitory signal. However, labeling the machine-readable medium 922 as "non-transitory" should not be construed to mean that the medium is incapable of movement—the medium should be considered as being transportable from one physical location to another. Additionally, since the machine-readable medium 922 is tangible, the medium may be considered to be a machine-readable storage device.

The instructions 924 may further be transmitted or received over a communications network 926 using a transmission medium. The instructions 924 may be transmitted using the network interface device 920 and any one of a number of well-known transfer protocols (e.g., hypertext transfer protocol (HTTP)). Examples of communications networks 926 include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying the instructions 924 for execution by the machine, and includes digital or analog communications signals or other intangible media to facilitate communication of such instructions 924.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method comprising:
   detecting that at least two open tabs of a browser are displaying different models of a same item type;
   responsive to the detecting, generating a table and populating the table with a first plurality of features of a first model of the same item type displayed in a first tab of the at least two open tabs and a second plurality of features of a second model of the same item type displayed in a second tab of the at least two open tabs, information from at least one additional tab that does not include a model of the same item type being excluded from the table; and causing display of the table in the browser.

2. The method of claim 1, wherein the same item type is detected based on text descriptions of the different models displayed in the at least two open tabs.

3. The method of claim 1, wherein the same item type is detected based on the at least two open tabs having a same uniform resource locator domain.

4. The method of claim 1, wherein the same item type is detected based on images displayed in the at least two open tabs.

5. The method of claim 1, wherein the table is generated without user input to select which open tabs to be included in the table and which open tabs to be excluded from the table.

6. The method of claim 1, further comprising receiving user input selecting a third tab to include in the table, and populating the table with a third plurality of features of a third model of the same item type displayed in the third tab that is open in the browser.

7. The method of claim 1, wherein the first tab and the second tab of the at least two open tabs correspond to different marketplace websites.

8. The method of claim 1, wherein generating the table further includes populating the table with a third plurality of features of a third model of the same item type displayed in the second tab of the at least two open tabs.

9. The method of claim 1, wherein generating the table further includes extracting the first plurality of features from the first tab and extracting the second plurality of features from the second tab.

10. The method of claim 9, wherein extracting the first plurality of features is based on metadata associated with a first item description displayed in the first tab and a frequency of occurrence of words included in the first item description.

11. The method of claim 9, wherein extracting the second plurality of features is based on metadata associated with a second item description displayed in the second tab and a frequency of occurrence of words included in the second item description.

12. An apparatus comprising:
one or more processors; and
a memory to store instructions which, when executed by the one or more processors, cause the one or more processors to perform operations comprising:
detecting that a first group of one or more open tabs of a browser are displaying different models of a first item type, and a second group of one or more open tabs of the browser are displaying different models of a second item type;
responsive to the detecting, generating a first table and populating the first table with a first plurality of features of a first model of the first item type and a second plurality of features of a second model of the first item type, the first and second models displayed in the first group of one or more open tabs, information from the second group of one or more open tabs being excluded from the first table; and
causing display of the first table in the browser.

13. The apparatus of claim 12, the operations further comprising generating a second table and populating the second table with a third plurality of features of a third model of the second item type and a fourth plurality of features of a fourth model of the second item type, the third and fourth items displayed in the second group of one or more open tabs.

14. The apparatus of claim 13, wherein the first item type is detected based on text descriptions of the first and second items displayed in the first group of one or more open tabs, and the second item type is detected based on additional text descriptions of the third and fourth items displayed in the second group of one or more open tabs.

15. The apparatus of claim 13, wherein the first item type is detected based on the first group of one or more open tabs including multiple tabs having a first uniform resource locator domain, and the second item type is detected based on the second group of one or more open tabs including multiple tabs having a second uniform resource locator domain.

16. The apparatus of claim 13, wherein the first item type is detected based on images displayed in the first group of one or more open tabs, and the second item type is detected based on additional images displayed in the second group of one or more open tabs.

17. The apparatus of claim 13, wherein the first table and the second table are generated without user input to select which tabs to include in the first table and which tabs to include in the second table.

18. The apparatus of claim 13, wherein the first model and the second model are displayed in a same tab of the first group of one or more open tabs, and the third model and the fourth model are displayed in a same tab of the second group of one or more open tabs.

19. The apparatus of claim 13, wherein the first model and the second model are displayed in different tabs of the first group of one or more open tabs, and the third item and the fourth item are displayed in different tabs of the second group of one or more open tabs.

20. A non-transitory machine-readable medium storing instructions, which when executed by a processor, cause the processor to perform operations comprising:
detecting that at least two open tabs of a browser are displaying different models of a same item type;
responsive to the detecting, generating a table and populating the table with a first plurality of features of a first model of the same item type displayed in a first tab of the at least two open tabs and a second plurality of features of a second model of the same item type displayed in a second tab of the at least two open tabs, information from at least one additional tab that does not include a model of the same item type being excluded from the table; and
causing display of the table in the browser.

* * * * *